INVENTORS
STANLEY J. KLEM JR.
HEINZ F. NITKA

ATTORNEY

INVENTORS
STANLEY J. KLEM JR.
HEINZ F. NITKA

3,271,571
X-RAY FILM CASSETTE WITH FILM FEEDING MEANS

Stanley J. Klem, Jr., and Heinz F. Nitka, Binghamton, N.Y., assignors to General Aniline & Film Corporation, New York, N.Y., a corporation of Delaware
Filed Apr. 8, 1963, Ser. No. 271,166
7 Claims. (Cl. 250—68)

This invention relates to holders for photographic sheet material, particularly to cassettes of the type used for the exposure and handling of X-ray films.

Various types of cassettes for X-ray work have had extensive use consisting generally of an oblong narrow casing with either a removable, or hinged cover, and light-sealing linings to accommodate a sheet of X-ray film. After exposure, these cassettes must be opened in the darkroom and the film removed for development.

Considerable progress has been made in the art of X-ray processing, particularly in the construction of processing apparatus which develops the X-ray film without either manual handling or darkroom requirement. Conventional cassettes are not suited for use in conjunction with such processing machines.

Accordingly, it is the primary object of this invention to provide an X-ray film cassette which fulfills the need of automatic X-ray film processing, as well as for conventional darkroom applications.

It is a particular feature of the cassette, in accordance with this invention that means are provided therewithin for constraining the film to leave the cassette without requiring full opening thereof.

It is a particular advantage of the cassette that in a processing machine to which it is adapted, all operations of opening and film removal are performed automatically by the sliding motion of the cassette entering the processing apparatus.

Other objects and features will be apparent from the following description of the invention, pointed out in particularity in the appended claims and taken in connection with the accompanying drawings in which:

Figure 1:
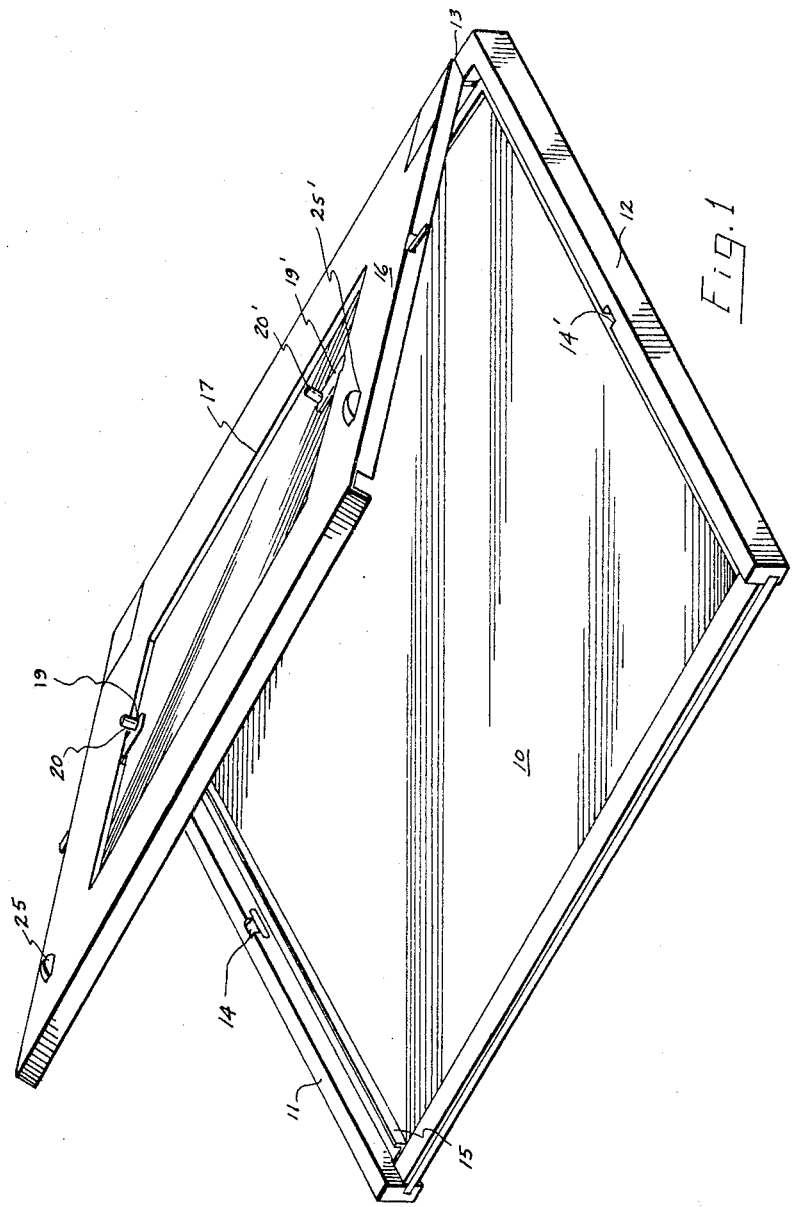
FIG. 1 is a perspective view of the cassette with the cover partially opened.

Referring to FIG. 1, the cassette comprises a shallow tray structure consisting of a bottom plate 10 and side walls 11, 12 and 13. The assembly may be constructed in any desired manner as for example, by slotting the side walls and inserting the bottom plate 10 therein. A channel member 15 surrounds the inner sides for the purpose of accommodating a suitable light sealing medium, such as felt, not shown here, which cooperates with the cover 16 similarly lined to form a light-tight enclosure.

Figure 2:
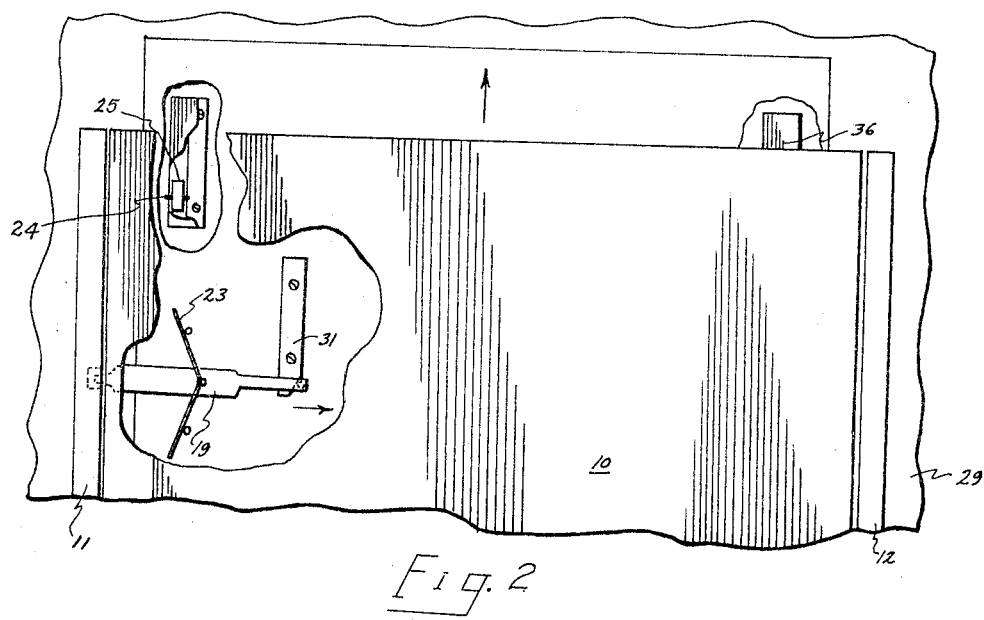
FIG. 2 is a fragmentary plan view of the cassette with certain parts broken away showing the location of one of the feed rollers and one of the latching mechanisms.
Figure 3:
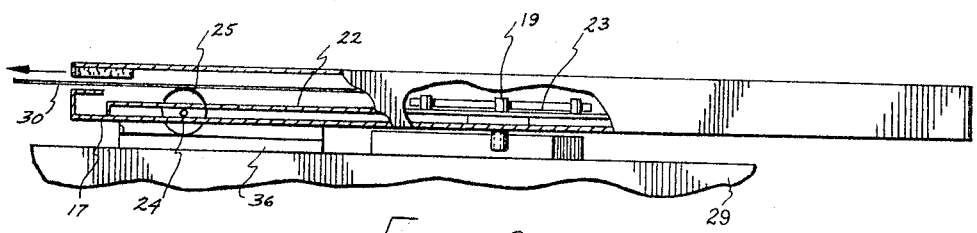
FIG. 3 is a transverse sectional view of the cassette.

The cover 16 is hinged to the rear wall 13 in any suitable manner allowing it to be lifted for the insertion of a photographic sheet material. The construction of the cover is further illustrated in FIGS. 2 and 3 to which reference should be had in the following description. It consists essentially of a double-walled construction of which the outer wall 17 is recessed for accommodation of the latching bar 19 and 19', which extend inwardly through suitable slots in the recessed portion, each bar having an actuating button 20 and 20', respectively. The inner wall 22, as seen in FIG. 3, extends parallel the inner side of the wall 17, the space between the two walls being utilized for the mounting of the latching mechanism consisting of the bar 19 and the biasing spring 23, the outer end of the bar 19 extending outwardly to form a latch with a cutout 14, 14' in the side walls 11 and 12. In the intervening space between the walls 17 and 22 are also located the shafts 24 and 24' of the rollers 25 and 25', respectively.

While the present invention is directed mainly to the construction of the cassette, its utility and advantage is chiefly in connection with X-ray processing apparatus designed to accommodate a cassette of this type. Consequently, the salient features of the cassette are illustrated in coactive relationship with pertinent portions and constructional details of a processing apparatus. Thus, prior to considering the illustrations in FIGS. 2, 3, 4, 5, 6 and 7, it is to be understood that the cassette, loaded with X-ray film and closed and exposed in a normal way, is placed over a feedboard of a processing machine. The latter is so constructed that as the cassette is moved over this board toward the machine to enter the receiving slot thereof, which accommodates the cassette, the mover is automatically unlatched and the film therein is automatically fed out toward the receiving rollers of the developing machine.

How this is accomplished is seen in connection with the figures referred to above. In FIG. 2, the cassette is shown cut away, resting on the feedboard 29. It is to be noted that the cassette is turned upside down so that the cover portion is now at the bottom. Thus, the rollers of which 25' is shown in the cutout, are engaging the feedboard 29. The film 30 in the cassette, as seen in FIG. 3, is also engaged by the roller 25. Suitable means are provided on the feedboard 29, such as the latch release bar 31, to actuate by means of its slanted portion, the button 20 of the latch 19. Consequently, as the cassette is sliding in the direction of the arrow, as seen in FIG. 2, the latch 19 is withdrawn. A similar condition exists in connection with the other latch bar 19', which is not shown here for the sake of simplicity of illustration. The friction rollers 25 and 25' thus constrain the film to move outwardly of the cassette toward the receiving rollers 34 and 35 located in the processing apparatus.

Figure 4:
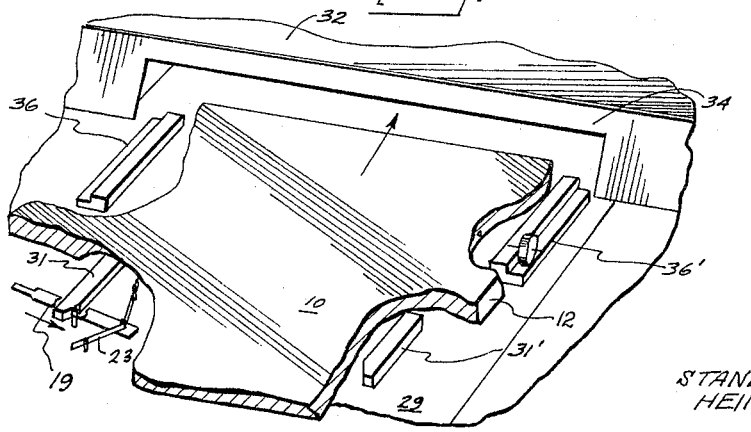
FIG. 4 is a fragmentary view showing in a schematic way, the construction of the infeed platform and the cassette entrance slot of a film processing apparatus with portions of the cassette cut away to illustrate the coaction of the rollers and latching mechanisms.

This action is also illustrated in FIG. 4 for a clearer understanding of the operation. It is seen that the platform 29 of the processing apparatus has suitable guides 36 and 36' for receiving the rollers 25 and 25' to prevent lateral motion of the cassette as it is being inserted into the processing apparatus.

Figure 5:
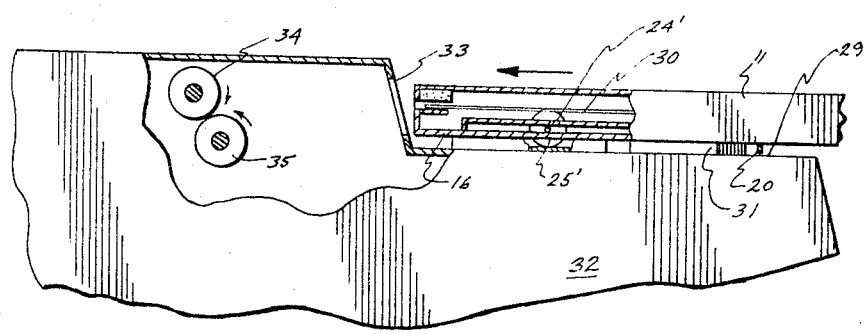
FIGS. 5, 6 and 7 are schematic sectional views of various positions of the cassette as it is being inserted in the film processing apparatus for the automatic outfeed of the X-ray film.
Figure 6:
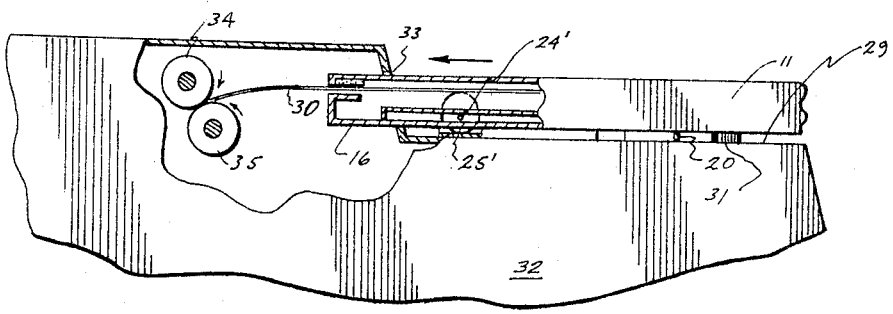
Figure 7:
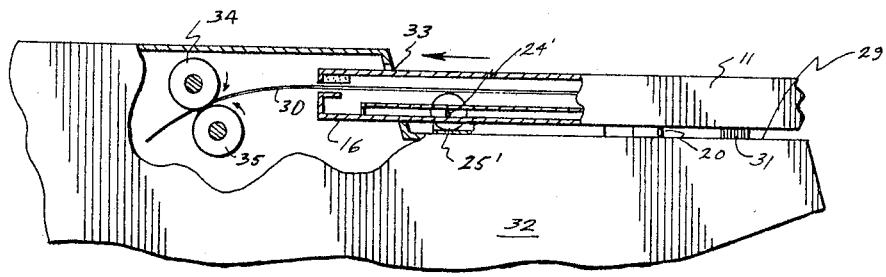

Referring to FIGS. 5, 6 and 7; FIG. 5 shows the initial step with the cassette resting on the platform 29 of the processing apparatus 32 prior to entry into the receiving slot 33.

FIG. 6 shows the cassette partially inserted with the film 31 in the nip of the rollers 34 and 35 and FIG. 7 shows the cassette fully inserted with the film 31 being fed into the machine by the rollers 34 and 35.

While it is one of the chief advantages of the cassette herein described to cooperate with a processing machine of suitable construction, it may also be used in the conventional manner for X-ray film exposure and handling in the darkroom. The latch buttons 20 and 20' may easily be actuated by a person to open the case and thus have access to the film.

What is claimed is:
1. A cassette for photographic film, comprising a shallow tray structure accommodating a sheet of film, a cover hinged thereto which when closed, exerts pressure on said film and forms a light-tight enclosure, latching means for locking said cover upon closure and means, supported by said cassette, frictionally engaging said film to advance the same partially out of said cassette upon release of said latching means.

2. A cassette for photographic film, comprising a shallow tray structure consisting of a bottom wall, three side walls and an open front, accommodating a sheet of film, a cover hinged thereto which when closed, exerts pressure on said film and forms a light-tight enclosure including said open front, a pair of rollers supported by and extending out from said cassette and engaging said film therewithin, latching means for locking said cover upon closure, said rollers being operable for feeding said film out of said cassette through said open front upon release of said latching means.

3. A cassette for photographic film, to be used in a processing apparatus having an infeed platform, comprising a shallow tray structure accommodating a sheet of film, a cover hinged thereto which when closed, forms a light-tight enclosure, a pair of rollers extending from said cassette and engaging said film therewithin, latching means for locking said cover upon closure, said rollers being operable upon frictional engagement with the platform of the processing apparatus during advancement of the cassette along said platform to feed said film out of said cassette and into the processing apparatus upon release of said latching means.

4. A cassette for photographic film in accordance with claim 3 wherein said cover has an inner wall portion and an outer wall, each of said walls having a pair of cutouts through which said rollers extend.

5. A cassette for photographic film in accordance with claim 3 wherein said latching means comprises a spring-biased sliding bar located in said cover and laterally extending at one end for engagement with a cutout in the said wall, said cover having a recessed portion over which the other end of said latching bar extends inwardly and a button on said inward extension for actuating said latch bar.

6. In combination with a processing apparatus having an inlet portion accommodating a cassette and infeed means for accepting a sheet of photographic film from said cassette and conveying it into said apparatus, a cassette containing said sheet and supporting roller means in contact with said sheet, said roller means being in contact with said processing apparatus, and being movable during movement of said cassette in the direction of said inlet portion, for frictionally feeding said sheet to said infeed means.

7. The combination in accordance with claim 6 wherein said infeed means comprises, a pair of rollers having contacting surfaces adapted to engage said film therebetween, said rollers being rotatable in the direction for conveying said film into said apparatus.

References Cited by the Examiner
UNITED STATES PATENTS

| | | | |
|---|---|---|---|
| 3,074,713 | 1/1963 | Sano | 250—65 X |
| 3,087,406 | 4/1963 | Dutch | 250—68 X |
| 3,105,903 | 10/1963 | Sano et al. | 250—65 X |

RALPH G. NILSON, *Primary Examiner.*

WILLIAM F. LINDQUIST, *Assistant Examiner.*